United States Patent
Wachter et al.

(10) Patent No.: US 6,531,517 B1
(45) Date of Patent: *Mar. 11, 2003

(54) PROCESS FOR INCREASING CARBON MONOXIDE HYDROGENATION ACTIVITY OF CATALYSTS VIA LOW TEMPERATURE OXIDATION WITH WATER, STEAM OR MIXTURE THEREOF

(75) Inventors: William Augustine Wachter, Baton Rouge, LA (US); Gregg Johnston Howsmon, Baton Rouge, LA (US); Jeffrey Thomas Elks, Baton Rouge, LA (US); Leroy Russell Clavenna, Baton Rouge, LA (US); Hyung Suk Woo, Baton Rouge, LA (US); Claude Clarence Culross, Baton Rouge, LA (US); Charles Harrison Mauldin, Baton Rouge, LA (US); Christine Esther Kliewer, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 28 days.

This patent is subject to a terminal disclaimer.

(21) Appl. No.: 09/630,279

(22) Filed: Aug. 1, 2000

(51) Int. Cl.$^7$ .......................... C07C 27/00; B01J 20/34; B01J 21/08; C10L 1/04; C10G 71/00
(52) U.S. Cl. ...................... 518/709; 518/715; 518/700; 502/20; 502/22; 502/23; 502/241; 502/325; 502/326; 208/15; 208/18; 208/61; 208/33
(58) Field of Search ............................... 518/700, 715, 518/709; 502/20, 22, 241, 23, 325, 326; 208/15, 18, 133, 61

(56) References Cited

U.S. PATENT DOCUMENTS

| | | | |
|---|---|---|---|
| 3,947,381 A | 3/1976 | Campbell et al. ....... | 252/466 B |
| 4,978,689 A | 12/1990 | Bell et al. .................. | 518/709 |
| 4,994,428 A | 2/1991 | Bell et al. .................. | 502/330 |
| 5,728,918 A | * 3/1998 | Nay et al. .................. | 585/733 |

FOREIGN PATENT DOCUMENTS

| WO | WO 0136352 | 5/2001 |
|---|---|---|

OTHER PUBLICATIONS

A. Khodakow et al., Structural Modification of Cobalt Catalysts: Effect of Wetting Studied by X–Ray and Infrared Techniques, Oil & Gas Science and Technology–Rev. IFP. vol. 54 (1999). No. 4.

* cited by examiner

Primary Examiner—Jafar Parsa
(74) Attorney, Agent, or Firm—Mark D. Marin

(57) ABSTRACT

A process for increasing the hydrogenation activity, particularly the carbon monoxide hydrogenation activity, of a catalyst or catalyst precursor comprised of a particulate solids support component and a catalytic metal, or metals component, preferably cobalt; cobalt alone or cobalt and an additional metal, or metals added to promote or modify the reaction produced by the cobalt. Treatment of the catalyst, or catalyst precursor is conducted at low temperature ranging from ambient to about 275° C. sufficient to form on the surface of a catalyst precursor, e.g., a cobalt catalyst precursor, a cobalt metal hydroxide, low valence cobalt metal oxide, or mixture of cobalt metal hydroxide and low valence cobalt metal oxide. Sometimes also metallic metal, e.g., cobalt, is also formed, and dispersed on the surface of the support. On reduction, as may be produced by contact and treatment of the catalyst or catalyst precursor with hydrogen, the oxidized metal, or metals component of the catalyst or catalyst precursor is reduced to elemental or metallic metal, and the activity of the catalyst thereby increased. A catalyst, activated or produced in this manner, is a useful composition of matter, the catalyst being particularly useful for efficiently conducting carbon monoxide hydrogenation reactions, especially F-T synthesis reactions, to provide a variety of useful products.

22 Claims, No Drawings

PROCESS FOR INCREASING CARBON MONOXIDE HYDROGENATION ACTIVITY OF CATALYSTS VIA LOW TEMPERATURE OXIDATION WITH WATER, STEAM OR MIXTURE THEREOF

1. FIELD OF THE INVENTION

A process for producing, or increasing the activity of catalysts for conducting hydrogenation reactions, particularly carbon monoxide hydrogenation reactions, and especially Fischer-Tropsch reactions.

2. BACKGROUND

Processes for the hydrogenation of carbon monoxide to produce waxy and/or oxygenated products for upgrading to highly valued chemical raw materials and/or hydrocarbon fuels and lubricants are well documented in the technical and patent literature. For example, in the Fischer-Tropsch (F-T) process, it is well known that the carbon monoxide component of synthesis gas can be catalytically converted by reaction with the hydrogen to reduction products constituting a range of waxy liquid hydrocarbons; hydrocarbons which can be readily upgraded to transportation fuels and lubricants. In these processes, e.g., catalysts constituted of Group VIII metals (Periodic Table of the Elements, Sargent-Welch Scientific Company, Copyright 1968), notably the Iron Group metals, particularly iron, ruthenium and cobalt, are generally preferred for the synthesis of $C_5+$ hydrocarbons; and copper has become the catalytic metal of choice for alcohol synthesis. These metals can exist in multiple valence states, and each state can display quite different behavior from the others. Each of the metals can be promoted or modified with an additional metal, or metals, or oxide thereof, to improve the activity and/or selectivity of the catalyst in conducting these reactions.

It is known that Iron Group metal surfaces exhibit higher activities for catalytic reactions such as hydrogenation, methanation and F-T synthesis when catalysts on which these metals are dispersed are subjected to high temperature oxidation, and subsequent reduction. Recent art can be found in Applied Catalysis, A, General 175 (1998) pp 113–120 and references therein. U.S. Pat. Nos. 4,492,774; 4,399,234; 4,493,905; 4,585,789; 4,088,671; 4,605,679; 4,670,414 and EPO 253924 disclose activation of cobalt catalysts by means of a reduction/oxidation/reduction (R-O-R) cycle, resulting in an increase in activity for F-T synthesis. Thus, typically such catalyst, e.g., supported reduced Co in the form of either a freshly prepared catalyst, or a low activity or deactivated catalyst, is contacted at high temperature ranging from about 300° C. to about 600° C. with a gaseous oxygen-containing stream to oxidize the metal, or metals, to its most stable oxide form, e.g., $Co_3O_4$. Precautions are taken during such treatments to control the exothermicity of the reaction to avoid sintering of the oxide metal particles, which can be detrimental to the activity of the catalyst. On reduction, i.e., on completion of the oxidation-reduction cycle, the dispersed oxide particles (e.g., the $Co_3O_4$) of the catalyst are reduced to dispersed metallic metal particles and the catalytic activity is increased or the fresh catalyst activated.

Considerable progress has been made in the development of catalysts, and processes, these developments providing good activity, and selectivity in alcohol synthesis, and in the conversion of hydrogen and carbon monoxide to distillate fuels and lubricants, predominantly $C_5+$ linear paraffins and olefins, with low concentrations of oxygenates. Nonetheless, there remains a pressing need for improved catalysts, and processes; particularly more active catalysts, and processes, for producing transportation fuels and lubricants of high quality at good selectivity at high levels of productivity.

3. SUMMARY OF THE INVENTION

This and other needs are achieved in accordance with the present invention embodying a low temperature process conducted by contacting a catalyst or catalyst precursor with liquid water or steam, or a mixture of liquid, water and steam, at sufficiently low temperature to increase the hydrogenation activity of the catalyst, especially its carbon monoxide hydrogenation activity, or oxidize and convert at least a portion of the metal, or metals component of the catalyst precursor to a metal hydroxide, low oxygen-containing metal oxide, or mixture of metal hydroxide and low oxygen-containing metal oxide. By oxidation is meant the conversion of a metal species to a low valence state, e.g., the Co species to a $Co^{2+}$ species. For example, in a low temperature oxidation treatment of a cobalt/$TiO_2$ catalyst precursor treated with liquid water or steam, or a mixture of liquid water and steam, all or a portion of the cobalt component of the catalyst precursor is oxidized and converted to $Co^{2+}$, i.e., a hydroxide of cobalt, $Co(OH)_2$, low oxide of cobalt, CoO, or mixture of these components; these components becoming intimately contacted with the surface of the support. At times some metallic cobalt is also formed and dispersed on the surface of the support. The carbon monoxide hydrogenation activity of a catalyst, e.g., a cobalt/$TiO_2$ catalyst of low activity, can similarly be increased by contacting said catalyst with water or steam, or a mixture of water and steam, and subsequent reduction. The mechanism of the reaction is not completely known. On reduction of the oxidized catalyst precursor, as may be produced by contact and treatment of the oxidized catalyst precursor with hydrogen, the dispersed metal oxide or hydroxylated catalytic metal, or metals component of the catalyst, e.g., CoO or $Co(OH)_2$, or mixture thereof, is reduced to elemental or metallic metal, e.g., Co; and the catalyst thereby activated. Optionally, the oxidized catalyst precursor may be dried in a non-oxidizing atmosphere and the hydroxide converted to a low oxygen content oxide, i.e., CoO. Optionally also, the oxidized catalyst precursor may be thermally treated, or dried and calcined in an oxidizing atmosphere to obtain a metal oxide or metal oxides, e.g., $Co_3O_4$. In both options, the catalyst is activated by reduction of the oxidized catalyst precursor. The oxidized catalyst precursor, and, catalyst made therefrom are useful compositions of matter, the activated catalyst being particularly useful for efficiently conducting hydrogenation reactions, notably carbon monoxide hydrogenation, especially F-T synthesis reactions, to provide a variety of useful products.

The catalyst and catalyst precursor composition, comprising the support component and catalytic metal, or metals component, on contact with the water or steam, or mixed phase water and steam, at low temperature is transformed: the catalytic metal(s) component of the catalyst precursor, e.g., Co, is oxidized and converted into metal hydroxides, low oxygen-containing metal oxides, or metal hydroxides admixed with oxides of the metal in low valence state, e.g., CoO, $Co(OH)_2$. It is found that the transformed metal, or metals, e.g., CoO or $Co(OH)_2$, of the catalyst precursor is more readily, widely and intimately dispersed on the surface of the support than a higher valence more stable oxide form, e.g., $Co_3O_4$; providing on reduction smaller crystallites of the metal, or metals which are a more highly active species than is produced by reducing $Co_3O_4$ to form the catalyst. The greater activity and stability of catalysts made by this process, and the fact that the oxidation step can be carried out at low temperature in an aqueous medium, or by simple contact with liquid water, or steam, or mixed phase of water and steam, are consequences of considerable import in the development of an F-T process.

The catalytic metal(s) of the catalyst precursor, on contact with the oxidizing liquid water or steam, or mixture thereof, converts at low temperature to its hydroxide or low valence oxide. Reactions taking place in this conversion for a cobalt based catalyst precursor thus include the following:

$$Co+H_2O <=> CoO+H_2 \quad (1)$$

$$CoO+H_2O <=> \text{``}Co(OH)_2\text{''}, \quad (2)$$

or the sum of reaction 1 and reaction 2:

$$Co+2H_2O <=> \text{``}Co(OH)_2\text{''}+H_2 \quad (3)$$

The hydroxide of cobalt is shown as "$Co(OH)_2$" in the above equations since its exact form can be more complicated than the pure metal hydroxide because with the low temperature treatment with liquid water or steam, the hydroxide of cobalt that is formed can interact with the support material (e.g., the $TiO_2$). The oxidation of the metal, as depicted in reactions 1 and 3, with liquid water or steam is considerable less exothermic than the oxidation of the metal directly with molecular oxygen. In addition, the exothermicity of the oxidation reaction is effectively moderated by the presence of excess water; especially liquid water. The metal hydroxide or oxy-anion(s) are intimately dispersed on the surface of the support, hence providing upon reduction with hydrogen or a hydrogen-containing gas small crystallites of the metal, or metals which are highly active species for carbon monoxide hydrogenation. Optionally, when the hydroxylated catalyst precursor is calcined, the metal hydroxide or low valence oxide particles are further oxidized to small oxide particles without the deleterious effect of the intense exothermic reaction of directly converting a reduced metal to the higher valence oxide, e.g., Co metal to $Co_3O_4$.

4. DETAILED DESCRIPTION

In the low temperature liquid water or steam oxidation treatment at least a portion of the catalytic metal component of the catalyst or catalyst precursor, a Group VIII or Iron Group metal, or metals, is oxidized, the hydrogenation activity of the catalyst being increased on activation with hydrogen. The catalyst precursor is oxidized to lower valence metal hydroxide or oxide by contact with liquid water or steam. The catalyst or catalyst precursor is treated by contact with the liquid water or steam at temperatures ranging from about 25° C. to about 275° C., preferably from about 100° C. to about 250° C., most preferably from about 150° C. to about 225° C., at not less than autogenous pressure, or pressures ranging from about 1 atmosphere (atm) to about 50 atm, preferably from about 1 atm to about 20 atm, for periods ranging from about 0.1 hour to about 24 hours, preferably from about 0.25 hour to about 10 hours; or until loss of pyrophoricity. In a preferred mode of practicing this invention the catalyst or catalyst precursor is dispersed or slurried in the liquid water, e.g., by containment in a reaction vessel, or autoclave. The metal, or metals, component of the catalyst precursor treated in such manner is transformed at the low temperature into a low oxidation state metal oxide or metal hydroxide, or mixture thereof. As will be recognized, the contacting time will be sufficient as required to obtain the desired amount of oxidation. Depending upon the design of the process, e.g., fixed bed, slurry bubble column, etc., the amount of water used varies greatly. For example, in a fixed bed operation, the water either in a liquid or steam phase or both is added in a flow-through mode. Typically, the fixed bed is fed water continuously which fills the void volume of the bed. This continuous feed of water has the added effect of sweeping out of the reactor gaseous reaction products (e.g., $H_2$) and, thus, drives reactions 1 and 3 to the right as oxidized metal products. For an operation associated with the use of a bubble column or a moving bed, the water oxidation may be carried in a batch or continuous mode. Regardless of the method used, the weight of water to the weight of catalyst varies typically from about 1:5 to about 100:1, preferably from about 1:1 to about 50:1, and most preferably from about 2:1 to about 10:1.

In the low temperature water or steam treatment, a significant portion of the catalytic metal component of the catalyst precursor is thus oxidized to metal hydroxides or lower oxidation state metal oxides, whereas high temperature oxidation with a molecular oxygen containing non-hydrated gas stream as described in the prior art, produces essentially complete oxidation of the metals component to the most stable oxide phase. For example, in the treatment of the catalyst precursor with liquid water or steam, or mixture thereof, the Co metal species is oxidized to CoO, $Co(OH)_2$, or both CoO and $Co(OH)_2$ rather than $Co_3O_4$. The catalyst precursor composition containing the $Co^{2+}$ metal oxidized species provides significantly different behavior from the composition obtained by conventional high temperature oxidation of the catalyst precursor with the non-hydrated oxygen containing gas.

The catalyst or catalyst precursor subjected to the low temperature oxidation treatment and used in accordance with this invention is characterized as the composite of a particulate solids support component and a supported cobalt component, which may be modified or promoted with an additional catalytic metal, or metals; and it is formed by gellation, cogellation or impregnation techniques; e.g., precipitation of gels and cogels by the addition of a compound, or compounds of the catalytic metal, or metals, from solution as by addition of a base, or by the impregnation of a particulate solids support, i.e., finely divided solids or powder, with a solution containing a compound or salt of the catalytic metal, or metals; techniques well known to those skilled in this art. The catalytic precursor within the meaning of this invention is thus the harbinger composition which, when the cobalt metal, or cobalt and other metals is oxidized; by contact with water or steam, or mixture of water and steam and then reduced, as by contact with hydrogen, is comprised of sufficient of the dispersed reduced catalytic metal, or metals, that it is useful in catalyzing hydrogenation reactions. In such preparation procedures a metal, or metals, inclusive of cobalt, catalytically active for conducting hydrogenation reactions, is composited with a particulate solids support, or powder, suitably a refractory inorganic oxide support, preferably a crystalline aluminosilicate zeolite, natural or synthetic, alumina, silica, silica-alumina, titania, or the like. For example, in impregnating a particulate support, or powder, the support or powder is contacted with a solution containing a salt, or compound of cobalt; and if desired, an additional metal, or metals, preferably a Group VIIB or Group VIII metal, or metals, of the Periodic Table of the Elements, or copper or thorium can be used to further modify or promote the catalytic reaction. Generally, from about 2 percent to about 70 percent, preferably from about 5 percent to about 50 percent metallic metal, or metals, inclusive of cobalt, is deposited upon the particulate solids support or powder, based upon the total weight (wt. %; dry basis) of the catalyst or catalyst precursor (or the finished catalyst produced from the catalyst precursor). Catalysts having a relatively high metal, or metals, loading are preferred because these catalysts can be loaded into slurry bubble columns over a broad range of concentrations for activation, and use for conducting F-T reactions up to that high concentration in which mixing and pumping the slurry becomes limiting. The impregnated powder or support may then be contacted with a reducing agent, suitably hydrogen at elevated temperature, to reduce the metal component to its low valence state, generally to metallic metal.

In conducting them low temperature oxidation treatment of a catalyst or catalyst precursor, a preferred procedure is generally as follows:

The catalyst or catalyst precursor is slurried in liquid water; the slurry of water:catalyst or catalyst precursor being contained in the reactor in volume ratio of at least about 0.5:1, preferably at least about 2:1, and higher. A temperature ranging from about 25° C. to about 275° C., preferably from about 100° C. to about 250° C., most preferably from about 150° C. to about 225° C., and a total reaction pressure ranging from about 1 atm to about 50 atm, preferably from about 1 atm to about 20 atm is maintained. The contact time between the catalyst precursor, or catalyst and the water ranges generally from about 0.01 hour to about 40 hours, more preferably from about 0.1 to about 10 hours, and most preferably ranges from about 0.2 hours to about 2 hours, or up to the point in time where the catalyst or oxidized catalyst precursor, loses its pyrophoricity.

The catalyst or catalyst precursor in the slurry is next separated from the water by evaporating or by filtering off the excess water and drying, and may then be further treated, or reduced as by contact with hydrogen, or a hydrogen-containing gas, at elevated temperature, preferably at temperature ranging from about 200° C. to about 600° C., preferably from about 300° C. to about 450° C., at hydrogen partial pressures ranging from about 0.1 atm to about 100 atm, preferably from about 1 atm to about 40 atm, i.e., sufficient to convert the metal hydroxide, low oxygen-containing metal oxide, or mixture thereof of the catalyst precursor to essentially the zero valent state, i.e., metallic metal.

The catalysts, or oxidized catalyst precursors after they have been reduced are used in a hydrogenation process, preferably a carbon monoxide hydrogenation process, particularly one wherein liquid, gaseous or solid hydrocarbon products are formed by contacting a synthesis gas comprising a mixture of $H_2$ and CO with the F-T hydrocarbon conversion catalyst of this invention under water gas shifting or non-shifting conditions; but preferably non-shifting conditions in which little or no water gas shift reaction occurs, particularly when the catalytic metal comprises Co, particularly Re or Ru or mixtures of one or both of these metals with cobalt.

The hydrocarbons produced in the F-T hydrocarbon conversion process are typically upgraded to more valuable products by subjecting all or a portion of the $C_5+$ hydrocarbons to fractionation and/or conversion. By "conversion" is meant one or more operations in which the molecular structure of at least a portion of the hydrocarbon is changed and includes both non-catalytic processing, e.g., steam cracking, and catalytic processing, e.g., catalytic cracking, in which the portion, or fraction, is contacted with a suitable catalyst. If hydrogen is present as a reactant, such process steps are typically referred to as hydroconversion and variously as hydroisomerization, hydrocracking, hydrodewaxing, hydrorefining and, the like. More rigorous hydrorefining is typically referred to as hydrotreating. These reactions are conducted under conditions well documented in the literature for the hydroconversion of hydrocarbon feeds, including hydrocarbon feeds rich in paraffins. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels includes gasoline, diesel fuel and jet fuel, while lubricating oil includes automotive oil, jet oil, turbine oil and the like. Industrial oils include well drilling fluids, agricultural oils, heat transfer oils and the like.

The following examples are illustrative of the salient features of the invention. All parts, and percentages are given in terms of weight, unless otherwise specified.

The two examples immediately following show the reactivation of deactivated Co-Re/$TiO_2$ (rutile) and Co-Re/silica catalysts, respectively, by contact and treatment with liquid water at low temperature.

EXAMPLE 1

(Treatment with Liquid Water)

A 1.75 gram portion of a Co-Re/$TiO_2$ catalyst (11% Co/0.68% Re/$TiO_2$), having an oxygen chemisorption value of 222 micromoles $O_2$/g catalyst, was added with 2.0 gm of liquid water to a 6 cc Teflon PFA tube and placed in a 190 cc Parr bomb. Another 40 gm portion of water was placed outside the Teflon test tube, but within the Parr bomb. The Parr bomb, containing this specimen, was charged to a 175° C. oven and maintained therein for 16.5 hours, discharged and air-dried. The oxygen chemisorption of the catalyst after reduction at 400° C. was measured and found to be 587 micromoles $O_2$/g catalyst.

These data, both the chemisorption values and Transmission Electron Microscopy, TEM, particle'size analysis for each of the catalysts are summarized in the following Table 1.

TABLE 1

|  | Catalyst | Water-treated Catalyst |
|---|---|---|
| $O_2$ Chemisorption (micromoles $O_2$/g catalyst) | 222 | 587 |
| Mean Particle Diameter (nm) | 13.0 | 6.2 |
| Std. Deviation (nm) | 4.9 | 2.4 |
| Median Particle Diameter (nm) | 12.3 | 5.9 |
| Minimum Particle Diameter (nm) | 1.6 | 1.3 |
| Maximum Particle Diameter (nm) | 36.9 | 20.5 |

EXAMPLE 2

(Treatment with Liquid Water)

The foregoing example was repeated except that 1.0 g of Co/Aerosil catalyst (44.6% Co/3.72% Re/silica; Cab-O-Sil EH-5), with an oxygen chemisorption value of 918 micromoles $O_2$/g catalyst, was employed; 3.0 g of water was added to the Teflon test tube, and 70 gm of liquid water was added to the Parr bomb outside the tube. The Parr bomb was then charged to a 175° C. oven for 15 hours, discharged, air-dried, and the oxygen chemisorption after reduction at 400° C. was measured to be 1948 micromoles $O_2$/g catalyst.

The following Examples 3 and 4, respectively, demonstrate the difference in the effectiveness of water and steam in reactivation of the deactivated catalysts.

EXAMPLE 3

(Treatment with Autogenous Steam)

A 2.0 gm portion of the catalyst as described in Example 1 (11% Co/0.68% Re/$TiO_2$), having an oxygen chemisorption value of 222 micromoles $O_2$/g catalyst, was treated with steam by placing 40 g of liquid water within the Parr bomb, but outside the Teflon test tube which contained the catalyst. After a similar time period of treatment at 175° C. in the oven, but with autogenous steam, not liquid water, the chemisorption value of the catalyst was increased to 394 micromoles $O_2$/g catalyst.

EXAMPLE 4

(Treatment with Liquid Water)

Another portion of catalyst similar to that described in Examples 1 and 3, but more deactivated (60 micromoles $O_2$/g catalyst), was treated in a Parr bomb with liquid water. Thus, inside the Teflon test tube was placed a 1.0 gm portion of the low dispersion catalyst and 2.0 g of water. Inside the Parr bomb but outside the Teflon test tube was placed 70 g of liquid water. The sample was charged to the 175° C. oven for 14 hours, discharged, and air-dried. The oxygen chemisorption after reduction at 400° C. was measured to be 502 micromoles $O_2$/g catalyst.

The results obtained in Examples 1–4 are tabulated in Table 2.

TABLE 2

| Adsorption: Micromoles $O_2$/g Catalyst Chemisorption | Example 1 | Example 2 | Example 3 | Example 4 |
|---|---|---|---|---|
| Catalyst | 222 | 918 | 222 | 60 |
| Treated Catalyst (Liquid Water Treatment 175° C.) | 587 | 1948 | — | 502 |
| Treated Catalyst (Steam Treatment at 175° C.) | — | — | 394 | — |

The data thus shows that liquid water is more effective than steam in increasing the dispersion of the catalysts; and, that liquid water is the preferred medium for treatment of the catalyst as contrasted with steam.

The liquid water or steam acts as an oxidant even though hydrogen may be present, and has been found, at the end of a reaction.

The following example demonstrates the presence of hydrogen at the end of the run in an autoclave.

EXAMPLE 5

2.0 g of a catalyst was charged to a 190 cc autoclave with 38 g of deionized water. The autoclave was sealed and purged with nitrogen for 5 minutes then sealed and run at a temperature of 190° C. for two hours. At the end of the run, the autoclave was purged with nitrogen and a total of $2.9 \times 10^{-4}$ moles of hydrogen was collected. This shows the autoclave environment to be as reducing as $3 \times 10^{-4}$ moles/(190 cc @ 1 atm, 273° K./22414 cc @ STP)=0.03 atm.

The following Examples 6–17 show that the best results can be attained when the steam is at or near saturation pressure, when steam is used as the oxidant.

EXAMPLES 6–17

(Treatment with Steam)

Two series of runs were conducted, a first series of 6 runs (Examples 6–11) with a first Catalyst "A", and a second series of 6 runs (Examples 12–17) with a second Catalyst "B". Each run was conducted at a total pressure of 280 psi, temperature of 225° C., and at different $H_2O/H_2$ molar ratios of "pure steam" to $H_2$, i.e., 100, 30 and 10, for 18 hours. At 225° C. the pressure of saturated steam is about 370 psi; and the steam partial pressure was below saturation in each of the runs of the two series.

These runs are summarized in the following Table 3.

TABLE 3

| Example | Identification of Catalyst (Composition) | g Catalyst | $H_2O/H_2$ | $O_2$ (micromol/g) |
|---|---|---|---|---|
|  | Catalyst "A" |  |  | 439 |
|  | Catalyst "A" (reduced in situ) |  |  | 316 |
| 6 | Catalyst "A" (reduced in situ then steamed) | 5 | 1/2 | 221 |
| 7 | Catalyst "A" (reduced in situ then steamed | 5 | 1/1 | 250 |
| 8 | Catalyst "A" (reduced in situ then steamed) | 20 | 10/1 | 403 |
| 9 | Catalyst "A" (reduced in situ then steamed) | 20 | 30/1 | 425 |
| 10 | Catalyst "A" (reduced in situ then steamed) | 20 | 100/1 | 389 |
| 11 | Catalyst "A" (reduced in situ then steamed | 20 | 100/0 | 250 |
|  | Catalyst "B" |  |  | 279 |
| 12 | Steam-Treated Catalyst "B" | 5 | 1/2 | 216 |
| 13 | Steam-Treated Catalyst "B" | 5 | 1/1 | 400 |
| 14 | Steam-Treated Catalyst "B" | 5 | 10/1 | 224 |
| 15 | Steam-Treated Catalyst "B" | 5 | 30/1 | 430 |
| 16 | Steam-Treated Catalyst "B" | 5 | 100/1 | 395 |
| 17 | Steam-Treated Catalyst "B" | 5 | 100/0 | 301 |

The example immediately following describes a series of CO hydrogenation runs, and subsequent runs following water treatments of additional portions of the catalyst to place the catalyst in different states of activity. The increased oxygen chemisorption values obtained as a result of the water treatments, it is shown, correlate with increased CO conversion; illustrating a significant increase in the rate of reaction for conversion of the CO to hydrocarbons.

EXAMPLE 18

A Co-Re/$TiO_2$ (11.15% Co-0.99% Re/$TiO_2$) catalyst having an oxygen chemisorption of 273 micromoles $O_2$/g catalyst (Catalyst No. 18B of Table 4), in an amount of 12 g was added, with 14 g of water to a 60 cc Teflon PFA test tube in a 190 cc Parr bomb. Inside the Parr bomb but outside the PFA test tube was placed 80 g of liquid water. The specimen was evacuated and then pressurized with nitrogen to about 80 psig at total of 10 times. The specimen was then charged to a 190° C. oven for 3 hours, discharged, air-dried, and then dried at 100° C. for 2 hours. The oxygen chemisorption after reduction at 400° C. of this water-redispersed specimen was measured to be 659 micromoles $O_2$/g catalyst (Catalyst No. 18C of Table 4). The oxygen chemisorption value of Catalyst 18A used to make Catalyst 18B was 454 micromoles $O_2$/g catalyst, as measured in each of two different runs made with two portions of the catalyst.

Prior to charging Catalysts 18A and Catalyst 18B and 18C, respectively, each was prereduced by contact with hydrogen at 375° C. for 1 hour. Hydrocarbon synthesis (HCS) runs were then made with each catalyst at 200° C. (feed=64% $H_2$, 32% CO, and 4% Ne) at 280 psig. The duration of each run was 20 hours.

TABLE 4

Water Dispersion Treats/HCS Runs

| Cat. No. | Adsorption: Micromoles $O_2$/g Catalyst | GHSV | CO Conv. | g Hydrocarbon produced/g Catalyst/h |
|---|---|---|---|---|
| 18B | 273 | 2000 | 66 | 0.18 |
| 18C | 659 | 2800 | 69 | 0.26 |

The data presented in Table 4 show as suggested, that consistent with the oxygen chemisorption increase, there is a significant increase in the value for conversion of the CO to hydrocarbons.

The hydrocarbons produced by a hydrocarbon synthesis process with the reactivated catalysts produced by the process of this invention are typically upgraded to more valuable products, by subjecting all or a portion of the $C_5+$ hydrocarbons to fractionation and/or conversion. By conversion is meant one or more operations in which the molecular structure of at least a portion of the hydrocarbon is changed and includes both noncatalytic processing (e.g., steam cracking), and catalytic processing (e.g., catalytic cracking) in which a fraction is contacted with a suitable catalyst. If hydrogen is present as a reactant, such process steps are typically referred to as hydroconversion and include, for example, hydroisomerization, hydrocracking, hydrodewaxing, hydrorefining and the more severe hydrorefining referred to as hydrotreating, all conducted at conditions well known in the literature for hydroconversion of hydrocarbon feeds, including hydrocarbon feeds rich in paraffins. Illustrative, but nonlimiting examples of more valuable products formed by conversion include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

Having described the invention, what is claimed is:

1. A process for increasing the hydrogenation activity of a catalyst consisting essentially of:
   contacting water, or steam, or a mixture of water and steam, with a catalyst or catalyst precursor comprised of a particulate solid support component and a metal, or metals component catalytically active for conducting a carbon monoxide hydrogenation reaction, while
   maintaining the water, or steam or mixture of water and steam at a temperature above ambient to about 275° C. sufficient to increase the hydrogenation activity of the catalyst or catalyst precursor.

2. The process of claim 1 wherein the metal, or metals component of the catalyst or catalyst precursor is present in concentration ranging from about 2 percent to about 70 percent, based on the total weight of the catalyst or catalyst precursor (dry basis).

3. The process of claim 2 wherein the metal, or metals component of the catalyst or catalyst precursor is present in concentration ranging from about 5 percent to about 50 percent.

4. The process of claim 1 wherein the medium contacted with the catalyst or catalyst precursor is comprised of liquid water, and the catalyst or catalyst precursor is slurried in the liquid water.

5. The process of claim 1 wherein the medium contacted with the catalyst or catalyst precursor is comprised of steam.

6. The process of claim 1 wherein the temperature maintained upon the medium contacted with the catalyst or catalyst precursor ranges from about 100° C. to about 250° C.

7. A process for increasing the hydrogenation activity of a cobalt catalyst, or for forming an oxidized cobalt catalyst precursor which, upon reduction, can be converted to a cobalt catalyst useful for conducting hydrogenation reactions, consisting essentially of
   contacting said cobalt catalyst, or a catalyst precursor characterized as a composite of a particulate solids support and a cobalt component at least a portion of which is present as metallic cobalt, with liquid water, or steam, or a mixture of liquid water and steam, while
   maintaining the liquid water, or steam or mixture of liquid water and steam at a temperature above ambient to about 275° C. sufficient to increase the hydrogenation activity of the cobalt catalyst, or oxidize, and form at least a protion of said cobalt metal component upon the surface of the particulate solids support of said cobalt catalyst precursor as a cobalt metal hydroxide, low valence cobalt metal oxide, or mixture of cobalt metal hydroxide and low valence cobalt metal oxide.

8. The process of claim 7 wherein the cobalt metal component of the catalyst or catalyst precursor is present in concentration ranging from about 2 percent to about 70 percent, based on the total weight of the catalyst or catalyst precursor (dry basis).

9. The process of claim 7 wherein the cobalt metal component of the catalyst or catalyst precursor is comprised of cobalt and a Group VIIB or Group VIII metal other than cobalt, cobalt and thorium, or cobalt and copper.

10. The process of claim 7 wherein the cobalt metal component of the catalyst or catalyst precursor is comprised of cobalt and rhenium, or cobalt and ruthenium.

11. The process of claim 7 wherein the oxidizing medium comprises liquid water.

12. The process of claim 7 wherein the oxidizing medium comprises liquid water, and the catalyst or catalyst precursor is slurried in the liquid water.

13. The process of claim 7 wherein the oxidizing medium comprises steam.

14. The process of claim 7 wherein the temperature maintained upon the oxidizing medium ranges from about 170° C. to about 225° C.

15. The process of claim 7 wherein the catalyst or oxidized catalyst precursor is contacted with hydrogen or a hydrogen-containing gas at elevated temperature to increase the activity of the catalyst, or reduce the cobalt metal hydroxide, low valence cobalt metal oxide, or mixture of cobalt metal hydroxide and low valence cobalt metal oxide, of the catalyst precursor, to form an active catalyst.

16. The process of claim 15 wherein the catalyst or oxidized catalyst precursor is thermally treated at elevated temperature prior to reduction with the hydrogen or hydrogen-containing gas.

17. A process for producing $C_5+$ hydrocarbons by the hydrogenation of carbon monoxide by reaction with hydrogen at reaction conditions in the presence of the catalyst made pursuant to the process of claim 1.

18. A process for producing $C_5+$ hydrocarbons by the hydrogenation of carbon monoxide by reaction with hydrogen at reaction conditions in the presence of the catalyst made pursuant to the process of claim 1, wherein at least a portion of the hydrocarbons formed are upgraded to more valuable products by at least one of fractionation and conversion operations.

19. The process of claim 18 wherein said $C_{5+}$ hydrocarbons are subjected to a catalytic process in which the molecular structure of a least a portion of said hydrocarbon is changed.

20. The process of claim 18 wherein said $C_{5+}$ hydrocarbons are subjected to a non-catalytic process in which the molecular structure of a least a portion of said hydrocarbon is changed.

21. The process of claim 19 wherein a diesel fuel is the product of said catalytic processes.

22. The process of claim 19 wherein a lubricant oil is the product of said catalytic processes.

* * * * *